(12) United States Patent
Morris

(10) Patent No.: US 10,156,655 B2
(45) Date of Patent: Dec. 18, 2018

(54) METHOD AND APPARATUS FOR MEASUREMENT OF PIPE SIGNALS FOR DOWNHOLE TRANSIENT ELECTROMAGNETIC PROCESSING

(71) Applicant: Steven Allen Morris, Spring, TX (US)

(72) Inventor: Steven Allen Morris, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 164 days.

(21) Appl. No.: 15/063,943

(22) Filed: Mar. 8, 2016

(65) Prior Publication Data

US 2017/0261635 A1    Sep. 14, 2017

(51) Int. Cl.
*G01V 3/38* (2006.01)
*G01V 3/30* (2006.01)

(52) U.S. Cl.
CPC . *G01V 3/38* (2013.01); *G01V 3/30* (2013.01)

(58) Field of Classification Search
None
See application file for complete search history.

(56) References Cited

U.S. PATENT DOCUMENTS

| | | |
|---|---|---|
| 5,581,024 A | 12/1996 | Meyer, Jr. et al. |
| 5,883,515 A | 3/1999 | Strack et al. |
| 5,892,361 A | 4/1999 | Meyer et al. |
| 6,204,667 B1 | 3/2001 | Won |
| 6,288,548 B1 | 9/2001 | Thompson et al. |
| 6,586,939 B1 | 7/2003 | Fanini et al. |
| 6,765,385 B2 | 7/2004 | Sinclair et al. |
| 6,891,376 B2 | 5/2005 | Hanstein et al. |
| 7,301,429 B1 | 11/2007 | Hall et al. |

(Continued)

FOREIGN PATENT DOCUMENTS

WO    2012109433 A2    8/2012

OTHER PUBLICATIONS

"Oilfield Bucking Units", Weatherford, Tubular Running Services, [Retrieved from the Internet, Jun. 21, 2017] www.weatherford.com/doc/wft130408; 3 pages.

(Continued)

*Primary Examiner* — Reema Patel
*Assistant Examiner* — Steven Christopher
(74) *Attorney, Agent, or Firm* — Cantor Colburn LLP

(57) ABSTRACT

Methods and systems for estimating properties of earth formations including conveying a carrier through a borehole having a transmitter, a first receiver, and a second receiver, the first receiver positioned a first distance from the transmitter and the second receiver positioned a second distance therefrom, generating with the transmitter a transient electromagnetic field, receiving a first measured signal at the first receiver, receiving a second measured signal at the second receiver, obtaining a total signal from the first measured signal and the second measured signal, determining a bucking coefficient, performing a bucking calculation employing the bucking coefficient, the first measured signal, and the second measured signal to extract a pipe signal, suppressing the pipe signal from the total signal to obtain a formation signal, estimating a formation property from the formation signal, and adjusting a drilling operation based on the estimated property of the formation.

23 Claims, 9 Drawing Sheets

(56) References Cited

U.S. PATENT DOCUMENTS

| | | |
|---|---|---|
| 7,408,355 B1 | 8/2008 | Forgang et al. |
| 7,598,741 B2 | 10/2009 | Fanini et al. |
| 7,994,790 B2 | 8/2011 | Itskovich et al. |
| 8,030,935 B2 | 10/2011 | Xiao et al. |
| 8,332,152 B2 | 12/2012 | Itskovich et al. |
| 8,762,107 B2 | 6/2014 | Pelegri et al. |
| 9,310,511 B2 | 4/2016 | Itskovich |
| 9,857,499 B2 | 1/2018 | Itskovich |
| 2004/0183538 A1 | 9/2004 | Hanstein et al. |
| 2005/0049791 A1 | 3/2005 | Besplav et al. |
| 2005/0093547 A1 | 5/2005 | Xiao et al. |
| 2005/0140374 A1 | 6/2005 | Itskovich |
| 2006/0192562 A1 | 8/2006 | Davydychev et al. |
| 2007/0216416 A1 | 9/2007 | Itskovich |
| 2008/0270032 A1 | 10/2008 | Nikitenko |
| 2009/0114009 A1 | 5/2009 | Thambynayagam et al. |
| 2009/0240435 A1 | 9/2009 | Itskovich et al. |
| 2009/0243618 A1 | 10/2009 | Wang et al. |
| 2010/0097065 A1 | 4/2010 | Itskovich et al. |
| 2010/0109905 A1 | 5/2010 | Itskovich et al. |
| 2010/0171501 A1 | 7/2010 | Alumbaugh et al. |
| 2011/0257886 A1 | 10/2011 | Itskovich et al. |
| 2014/0121974 A1* | 5/2014 | Itskovich ............ G01V 3/38 702/7 |
| 2014/0207379 A1* | 7/2014 | Bjornemo ............ G01V 3/38 702/2 |
| 2015/0115965 A1 | 4/2015 | Riederman et al. |
| 2015/0241592 A1 | 8/2015 | Itskovich et al. |
| 2017/0235012 A1 | 8/2017 | Itskovich et al. |
| 2017/0261633 A1 | 9/2017 | Morris |
| 2017/0261636 A1 | 9/2017 | Morris |

OTHER PUBLICATIONS

International Search Report for International Application No. PCT/US2017020367 dated Jun. 2, 2017 (3 pp.).

Written Opinion of the International Searching Authority for International Application No. PCT/US2017/020367 dated Jun. 2, 2017 (10 pp.).

* cited by examiner

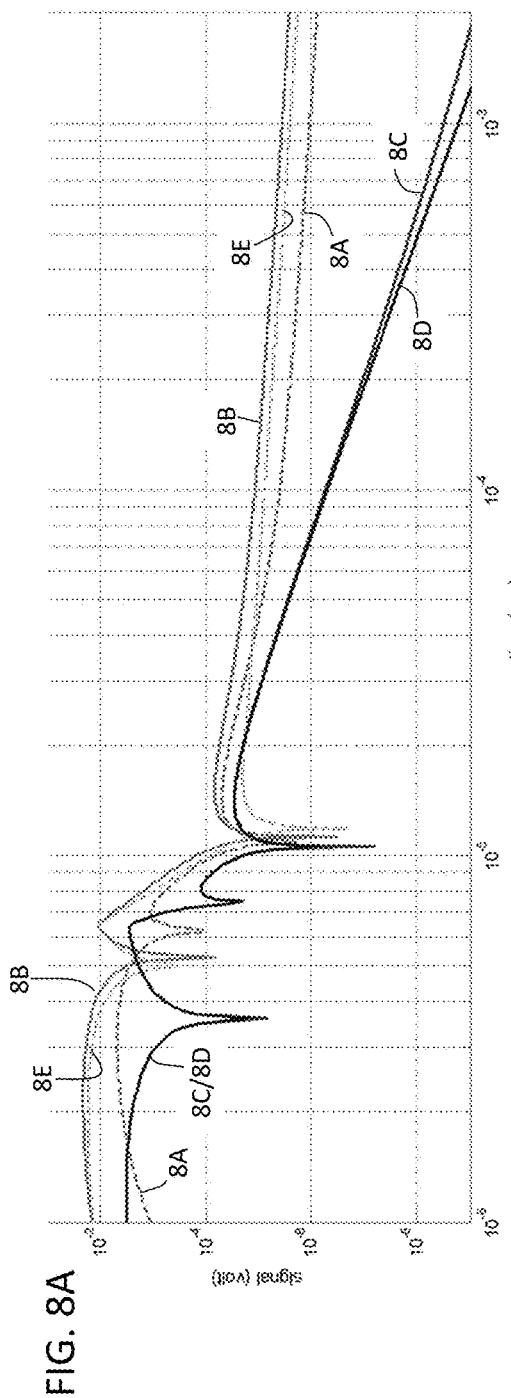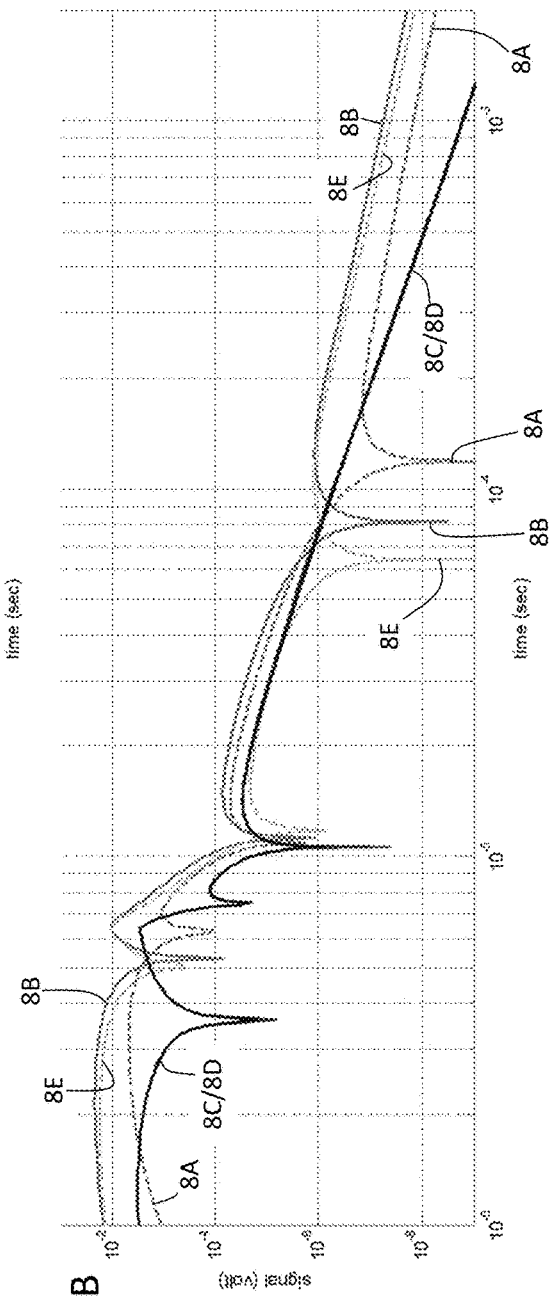

METHOD AND APPARATUS FOR MEASUREMENT OF PIPE SIGNALS FOR DOWNHOLE TRANSIENT ELECTROMAGNETIC PROCESSING

BACKGROUND

The ultimate objective of any geophysical experiment is to find properties of a formation using the measured data. To accomplish the objective a processing technique, called inversion, is applied. Inversion requires a mathematical model, which is used to produce synthetic data. The model has to include all of the necessary parameters that affect the measurements because an accurate model is needed for a successful inversion. Because the amount of recordable data is limited, no geophysical inverse problem is uniquely solvable and inferences of formation properties are statistical.

The possibility to reduce the range of uncertainty in the inverted models is driven by the sensitivity of the data to parameters of interest and the level of noise in the data. The noise can be either random or systematic. Because of this, mechanisms for improving sensitivity to the parameters of a formation have been developed. For example, a technique referred to as bucking was developed to improve sensitivity to the parameters of the formation while eliminating systematic noise caused by a primary field and/or the conductive tools used to make the measurements. If bucking does not account for electromagnetic interference between a conductive tool body and a formation, this interference will create or be a source of additional systematic noise. For this reason, it is beneficial to develop techniques for reducing inconsistency between measured and synthetic model responses and thus reduce uncertainty in estimated parameters of a formation.

SUMMARY

A method for estimating a property of an earth formation penetrated by a borehole is provided. The method includes conveying a carrier through a borehole, the carrier having a transmitter, a first receiver, and a second receiver disposed thereon, the first receiver being positioned at a first distance from the transmitter and the second receiver being positioned at a second distance from the transmitter, generating, while downhole, using the transmitter, a transient electromagnetic field, receiving a first measured signal at the first receiver, receiving a second measured signal at the second receiver, obtaining a total signal from the first measured signal and the second measured signal, determining a bucking coefficient k, performing a bucking calculation employing the bucking coefficient k, the first measured signal, and the second measured signal to extract a pipe signal, suppressing the pipe signal from the total signal to obtain a formation signal, estimating a formation property from the formation signal to select a model of the formation, and adjusting a drilling operation based on the estimated property of the formation.

A system for estimating a property of an earth formation penetrated by a borehole is provided. The system includes a carrier configured to be conveyed through a borehole, a transmitter disposed on the carrier and configured to transmit transient electromagnetic fields, a first receiver disposed on the carrier a first distance from the transmitter and configured to receive signals from the transmitter, a second receiver disposed on the carrier a second distance from the transmitter and configured to receive signals from the transmitter, and a processor configured to estimate a property of the formation. The system is configured to generate, while downhole, a transient electromagnetic field at the transmitter, receive a first measured signal at the first receiver, receive a second measured signal at the second receiver, obtain a total signal from the first measured signal and the second measured signal, determine a bucking coefficient k, perform a bucking calculation employing the bucking coefficient k, the first measured signal, and the second measured signal to extract a pipe signal, suppress the pipe signal from the total signal to obtain a formation signal, and estimate a formation property from the modified total signal to select a model of the formation.

BRIEF DESCRIPTION OF THE DRAWINGS

The following descriptions should not be considered limiting in any way. With reference to the accompanying drawings, like elements are numbered alike:

FIG. 8A is a schematic plot of transient measurements in a 10 Ω-m homogeneous formation;

FIG. 8B is a schematic plot of transient measurements in a 10 Ω-m homogeneous formation employing embodiments of the present disclosure;

The detailed description explains embodiments of the present disclosure, together with advantages and features, by way of example with reference to the drawings.

DETAILED DESCRIPTION

A detailed description of one or more embodiments of the disclosed apparatuses and methods presented herein are presented by way of exemplification and not limitation, with reference made to the appended figures.

Disclosed are methods and systems for measuring pipe signals during transient electromagnetic measurements. Pipe signals are signals that are generated by a pipe during a transient electromagnetic measurement. Pipe signals are generally undesirable as they can negatively impact a signal from a formation, which is the goal of a transient electromagnetic measurement. Using a transient electromagnetic tool with a single transmitter and two receivers, signals at the two receivers are bucked to eliminate a formation response and thus a pipe response may be extracted. Currently, a pipe response measurement is used for signal processing of transient electromagnetic signals. Current methods to measure pipe response may use an air-hang test, which may be expensive and difficult to conduct for transient electromagnetic tools. As provided herein, methods and processes in accordance with embodiments of the present disclosure enabled easier and/or more efficient pipe signal measurements for air-hang tests. For example, embodiments provided herein may eliminate the need to suspend a tool with a crane. Further, various embodiments provided herein enable measurement of the pipe signal in situ and thus changes in a pipe signal caused by pipe bending, temperature induced changes in pipe conductivity, etc. can be tracked.

Figure 1:
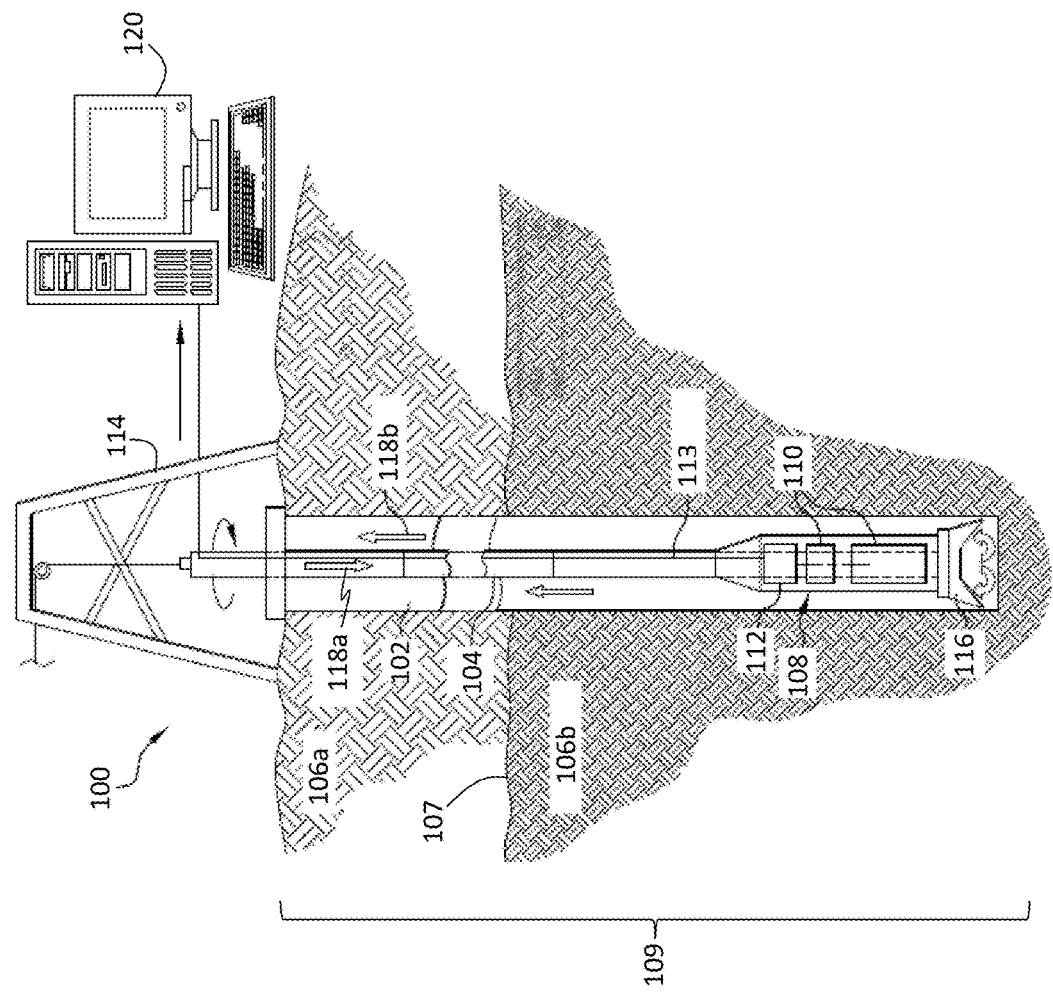
FIG. 1 is a cross-sectional view of an embodiment of a downhole drilling, monitoring, evaluation, exploration and/or production system in accordance with an embodiment of the present disclosure.

Referring to FIG. 1, a non-limiting schematic illustration of a downhole drilling, monitoring, evaluation, exploration, and/or production system 100 associated with a borehole 102 is shown. A carrier 104 is run in the borehole 102, which penetrates one or more earth formations 106a, 106b for facilitating operations such as drilling, extracting matter from the formation, sequestering fluids such as carbon dioxide, and/or making measurements of properties of the formations 106a, 106b, a formation interface 107 (i.e., the interface between the formations 106a, 106b), and/or the borehole 102 downhole. The carrier 104 includes any of various components to facilitate subterranean operations. In various embodiments, the carrier 104 is constructed of, for example, a pipe, multiple pipe sections, flexible tubing, or other structures. In other configurations, the carrier 104 is constructed of an armored wireline, such as that used in wireline logging. The carrier 104 is configured to include, for example, a drilling system and/or a bottom-hole assembly (BHA) on a downhole end thereof.

The system 100 and/or the carrier 104 may include any number of downhole tools 108 for various processes including drilling, hydrocarbon production, and formation evaluation for measuring one or more physical properties, characteristics, quantities, etc. in and/or around the borehole 102. For example, in some embodiments, the downhole tools 108 include a drilling assembly and/or a pumping assembly. Various measurement tools can be incorporated into the system 100 to affect measurement regimes such as wireline measurement applications, measurement-while-drilling (MWD), and/or logging-while-drilling (LWD) applications.

While the system 100 may operate in any subsurface environment, FIG. 1 shows the downhole tools 108 disposed in the borehole 102 penetrating the earth 109 (including a first formation 106a and a second formation 106b). The downhole tools 108 are disposed in the borehole 102 at a distal end of the carrier 104. As shown, the downhole tools 108 include measurement tools 110 and downhole electronics 112 configured to perform one or more types of measurements in LWD or MWD applications and/or operations. In a LWD or MWD configuration, the carrier 104 is a drill string. The measurements may include measurements related to drill string operation, for example.

A drilling rig 114 is configured to conduct drilling operations such as rotating the carrier 104 (e.g., a drill string) and, thus, a drill bit 116 located on the distal end of the carrier 104. As shown, the drilling rig 114 is configured to pump drilling fluid 118a through the carrier 104 in order to lubricate the drill bit 116. The drilling fluid 118a becomes a flushing fluid 118b to flush cuttings from the borehole 102.

The downhole electronics 112 are configured generate data, i.e., collect data, at the downhole tools 108. Raw data and/or information processed by the downhole electronics 112 may be telemetered along telemetry 113 to the surface for additional processing or display by a computing system 120. In some configurations, drilling control signals are generated by the computing system 120 and conveyed downhole to the downhole tools 108 or, in alternative configurations, are generated within the downhole electronics 112 or by a combination thereof. The downhole electronics 112 and the computing system 120 may each include one or more processors and one or more memory devices.

Different layers or formations of the earth 109 may each have a unique resistivity. For example, the first formation 106a may have a first resistivity and the second formation 106b may have a second resistivity. Depending on the compositions of the first formation 106a and the second formation 106b, the first resistivity may be different from the second resistivity. In order to measure and/or detect these resistivities, and thus extract information regarding the formations 106a, 106b, and/or the interface 107 therebetween, the downhole tools 108 are configured to obtain electromagnetic information. Accordingly, the downhole tools 108 include one or more transmitters (transmitter coils) that turn a current impulse in a transmitter coil on and off to induce a current in the earth 109 (e.g., formations 106a, 106b). One or more receivers are be configured to receive a resulting transient electromagnetic (TEM) signal. Those of skill in the art will appreciate that the transmitter(s) and receiver(s) may be one-, two-, or tri-axis devices, and/or other transceiver devices may be employed without departing from the scope of the present disclosure. The transmitters may use magnetic dipoles to induce currents in the earth 109. Further, in some embodiments, a switchable magnet can be used to generate formation transients.

Figure 2:
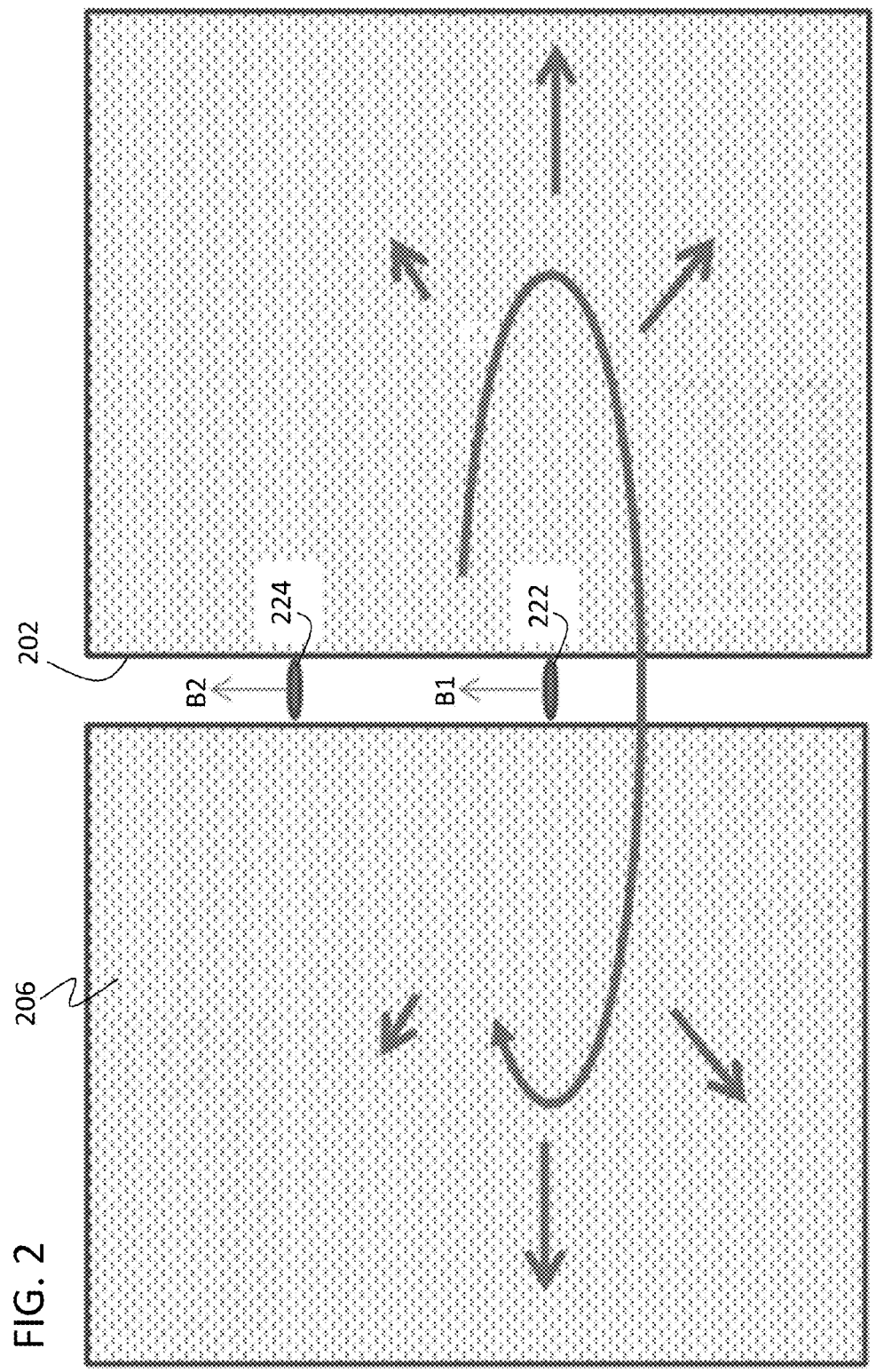
FIG. 2 is a schematic illustration of eddy currents generated in a formation in accordance with an embodiment of the present disclosure.

Turning now to FIG. 2, a schematic illustration of a transient electromagnetic method of downhole geophysical measurement is shown. A formation 206 is shown having a borehole 202 formed therein. Components of a downhole tool are schematically shown as a transmitter 222 and a receiver 224. The transmitter 222 is configured to employ a fast reversing magnetic dipole, denoted as primary magnetic field B1 to induce currents in the formation 206. These currents diffuse outward away from the borehole 202, as schematically illustrated. The currents within the formation generate a secondary magnetic field B2. As configured, a derivative of the secondary magnetic field B2 is sensed by the receiver 224. Accordingly, a measurement obtained by the downhole tool, e.g., receiver 224, consists of transient voltages generated in coils of the receiver 224. Inversion of geophysical data (e.g., the measured voltage at the receiver 224) enables making inferences about properties of the formation 206 from the acquired data. Mathematically, the inferences involve a process of finding a model that provides a best-fit between the measurements and synthetic data.

For example, the fast reversing magnetic dipole of the transmitter 222 may induce eddy currents in the carrier that supports and carries the downhole tools including the transmitter 222 and the received 224 (e.g., as shown in FIG. 1), which results in uncertainty in the model fitting. For example, when an electrically conductive structural member forms part of the carrier (e.g., a drill string), uncertainty in signals can arise. In one non-limiting example, a drill collar is configured to carry a transient electromagnetic apparatus (e.g., the electromagnetic apparatus includes the transmitter 222 and the receiver 224).

Figure 3:
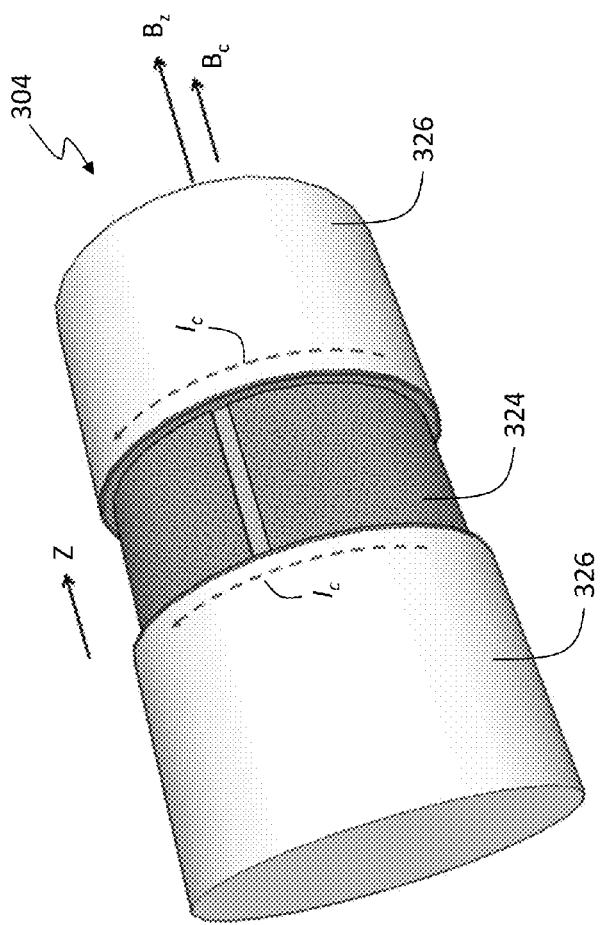
FIG. 3 is a schematic illustration of a portion of a carrier in accordance with an embodiment of the present disclosure.

As shown in FIG. 3, an illustration of the interaction of transmitted magnetic field and magnetic field from currents induced in the carrier 304 during a transient measurement are shown. In the configuration of FIG. 3, a transmitter (not shown) is oriented in the axial direction, designated as a Z direction. A receiver 324 is configured as a cylindrical magnetically permeable core mounted in a recess of the carrier 304, such as a conductive metallic mandrel 326 of a downhole tool. At the beginning of a transient measurement, the transmitter, located a predetermined distance away in the Z direction, may produce a step Bz in magnetic field along the axis of the receiver 324 (e.g., along the Z direction of the receiver 324). The magnetic core of the receiver 324 shields the carrier 304 from the step Bz in magnetic field, but at the edges of the magnetic core of the receiver 324 a circumferential current Ic may be induced in the metallic mandrel 326 of the carrier 304. In accordance with Lenz's Law the induced circumferential current Ic will produce a magnetic field Bc that opposes the transmitter induced step Bz in magnetic field.

Accordingly, a summation of the transmitter magnetic field (e.g., Bz) and carrier current induced magnetic field (e.g., Bc) to produce the total axial magnetic field in the vicinity of the receiver 324 is a measured magnetic field, and thus modified from an actual induced current from a formation. The total magnetic field (e.g., measurement) consists of a step from the transmitter and an opposing magnetic field from the carrier currents, which have a magnitude that decreases with time. Accordingly, a total sum and a secondary field that is induced by the sum in the formation can be measured.

This additional magnetic field can result in measurements that deviate from a desired measurement. That is, the additional magnetic field alters measured results and thus impact models that are desired to determine a structure, composition, and/or other characteristic of one or more formations in the earth. As time passes during measurements, the cumulative effect of the carrier signal causes modeling to diverge significantly from a data-set (e.g., measurements) that were based solely on signals measured without the influence and/or impact of a magnetic field in a carrier. That is, while the magnetic field from carrier currents affects a formation response, it may also dominate a signal measured in the receiver, effectively masking a formation response during the measurement.

Figure 4:
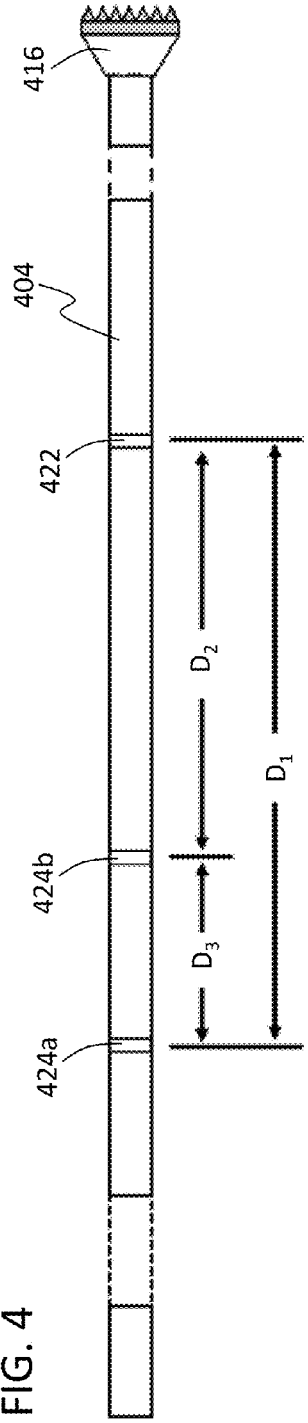
FIG. 4 is a schematic illustration of a carrier having a drill bit configured in accordance with an embodiment of the present disclosure.

Referring to FIG. 4, a schematic illustration of a carrier 404 configured to account for a carrier induced signal is shown. The carrier 404 is configured to perform an operation referred to as bucking, wherein a carrier induced signal is detected and then removed from a total signal to thus extract out a formation signal. As shown, the carrier 404 is configured with a bit 416 disposed on a distal end of the carrier 404. A transmitter 422 is located on the carrier 404 and a first, or main, receiver 424a is located on the carrier 404 at a first distance D1 from the transmitter 422. A second, or bucking, receiver 424b is located on the carrier 404 at a second distance D2 from the transmitter 422. The carrier induced signal is suppressed by using the two receivers 424a, 424b which are spaced apart by a third distance D3 (i.e., the difference between distances D1 and D2). The signal induced in the receivers 424a, 424b by carrier currents is proportional to the cube of the distance between the specific receiver 424a, 424b and the transmitter 422, while a formation signal is almost equal in each receiver 424a, 424b. This allows the carrier signal to be bucked out (e.g., eliminated and/or accounted for) and the measured formation signal is extracted. As shown, the bucking receiver (second receiver 424b) is shown as closer to the transmitter 422 than the main receiver (first receiver 424a). This configuration is merely provided for illustrative purposes and is not intended to be limiting.

The bucking process is used to reduce uncertainty in measured data. However, other sources of uncertainty exist, such that additional techniques are desirable. In addition to the bucking technique, synthetic data may be used to reduce the uncertainty of measurements, thus enabling better modeling and/or fits to models. The synthetic data is data that represents certain characteristics or components of a signal which are then accounted for in processing of measured real-world data, such that the output is an accurate reflection of the characteristics, features, and/or properties of the formation located in the earth. For example, if real-world data (e.g., measurements) are affected by a conductivity of a carrier in a downhole operation, the synthetic data have to be affected by the carrier as well. As provided herein, methods and processes for providing a basic measurement of a formation response by bucking out a pipe response are provided.

Problems may arise with transient measurements in the presence of pipe signals. For example, a pipe signal may affect a transient electromagnetic measurement in two ways. First, the pipe signal can produce a formation response that varies significantly from the response of the formation to the transmitter's dipole step reversal. Second, the receiver voltages consist of the formation responses convolved with the pipe signal, so the receiver voltages can be dominated by the pipe signal.

Further, problems may arise with respect to formation model inversion. For example, the first item listed above can cause problems with inversion routines used to produce an earth model from a measured signal. In an inversion scheme, an earth model is proposed and a curve of the formation response is generated using forward modeling software. The model curve is compared to the measured curve and a search algorithm is employed to vary the earth model parameters and iterate until the model curve approximately matches the measured response. Under current schemes, the forward modeling software does not account for the effect of the pipe signal on the formation response, so the inversion routine may fail to converge or may produce an erroneous model.

Moreover, problems may arise with respect to dynamic range and bucking coefficient estimation. The second item, discussed above, causes dynamic range problems when extracting the formation signal through bucking.

Figure 5:
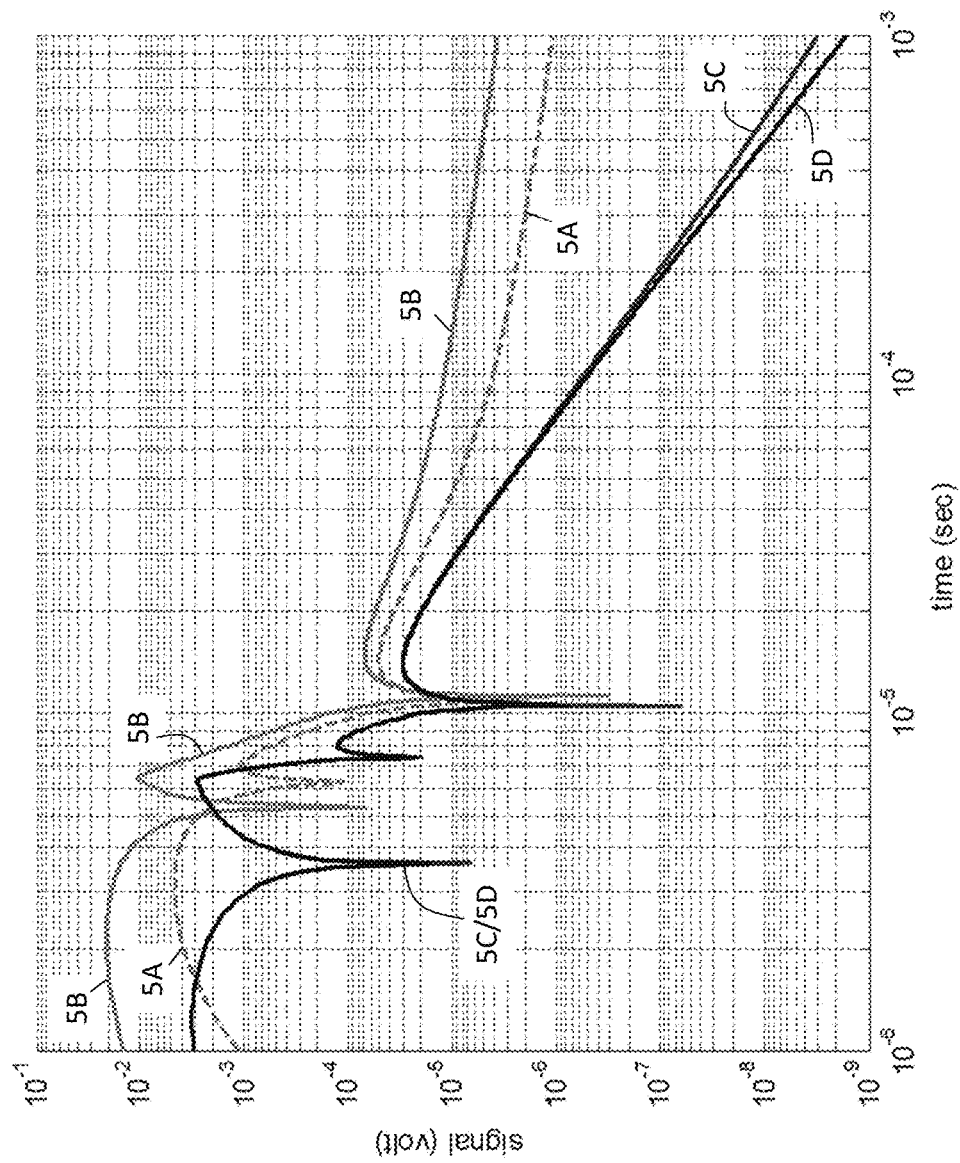
FIG. 5 is a schematic plot of signals as a function of time demonstrating that a response is dominated by a pipe signal.

For example, as shown in FIG. 5, the received signals in the coils are dominated by the pipe signal. In FIG. 5, curve 5A is the main coil signal, curve 5B is the bucking coil signal, curve 5C is the bucked signal (with pipe), and curve 5D is a no-pipe signal (e.g., formation only). The bucking calculation requires that two large numbers (e.g., curves 5A, 5B) be subtracted to produce the small formation signal (e.g., curve 5D). While this is generally practical to do when the received signals are up to ten times the extracted signal, it becomes increasingly difficult as the received signals approach one hundred to one thousand times the extracted signal. Any error in the estimation of the bucking coefficient can produce large errors in the extracted signal. One solution to alleviate this is by lengthening the sensors and employing copper shields to reduce the pipe signal, but mechanical constraints in LWD tool design can severely limit such a solution. Best sensor designs result in about a 100:1 ratio of received signal to extracted formation signal at the 200 to 300 microsecond limit of the measurement.

Figure 10:
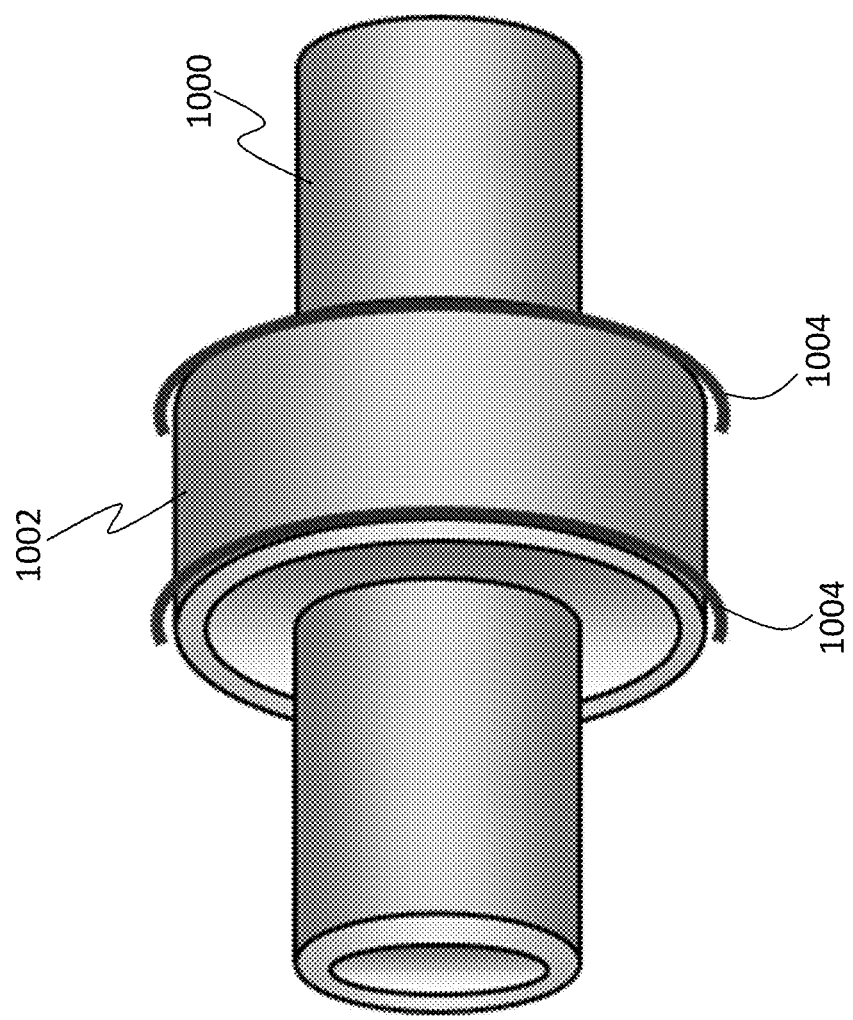
FIG. 10 is a schematic illustration of a downhole tool having a first and a second transmitter configured in accordance with an embodiment of the present disclosure.

However, both problems discussed above can be alleviated by using active suppression of the pipe signal. This technique uses an auxiliary coil at the transmitter to produce a time varying B-field that cancels the effect of the pipe signal. For example, an auxiliary coil can be configured on or about the transmitter 422 shown in FIG. 4 or as shown in FIG. 10.

In any event, there is a need for a pipe signal measurement. For example, with the two methods of pipe signal amelioration are discussed above ((i) convolving the pipe signal response with forward model curves to adjust model curves to measured curves and (ii) active compensation to physically suppress the pipe signal) a measurement of the pipe signal is required. The pipe signal is, in theory, a time varying curve whose scale and shape do not change over time. In fact the pipe signal curve can change due to pipe bending and changes in pipe conductivity as a function of downhole temperature. However, assuming an unchanging pipe signal curve, the pipe signal can in theory be measured using an air-hang experiment.

However, there may be problems with an air-hang test to determine a pipe signal. In an air-hang experiment, a LWD tool is suspended in the air, far from any conducting media. In such an experiment, in theory, the only signal measured will be the pipe signal curve. Several problems or factors associated with this technique for measuring may arise. For example, air-hang tests for deep reading electromagnetic LWD tools can be quite expensive to conduct, requiring rental of an expensive crane and use of specially selected locations. Air-hang tests, which are conducted at the Earth's surface, can be extremely electrically noisy because of cultural noise. For transient measurements, this is a particularly severe problem because the measurement is broadband from a few hertz to about 150 kHz. For transient electromagnetic, being a deep reading measurement, it is practically impossible to locate the tool far enough away from the Earth to suppress the Earth response during the air-hang test. For example, even suspending the tool 100 feet above the Earth may only suppress the Earth signal response by a factor of 10 or so. Finally, air-hang tests cannot account for changes in the pipe signal due to pipe bending and changes in pipe conductivity as a function of temperature.

Accordingly, there is a need for a practical and inexpensive method to measure pipe signal for downhole transient electromagnetic tools. This method can be applicable to measurement of pipe signal with the tool in situ. In accordance with embodiments of the present disclosure, basic measurement of formation responses by bucking out pipe response is provided. Embodiments provided herein can employ a downhole tool similar to that shown in FIG. 4, e.g., a single transmitter and two receivers. The two receivers are spaced from the transmitter by two different differences, e.g., as shown in FIG. 4. In some configurations, both receivers can be configured to have the same moment. Accordingly, as provided herein, a practical and inexpensive method is provided to measure pipe signal for downhole transient electromagnetic tools. The method may be performed downhole or in situ.

As will be appreciated by those of skill in the art, and described above, a formation has a resistivity associated therewith. The resistivity of the formation enables measurements of magnetic fields such that data may be generated that are representative of the formation. This data is then used to find a best-fit model, and thus an estimation of the physical characteristics and/or make-up of the formation may be made. Further, as noted above, a carrier, particularly a metallic carrier, introduces uncertainty when fitting a model to the data. One source of such uncertainty is a magnetic field induced by the carrier itself, as described above, and can be accounted for using a bucking process.

In accordance with embodiments provided herein, two pipe signals P1 and P2, detected at first and second receivers respectively, are the receiver responses with no formation to a unit dipole step. The first receiver is positioned at a first distance $d_1$ from the transmitter and the second receiver is positioned at a second distance $d_2$ from the transmitter. The responses of the receivers are a combined response to the pipe currents adjacent to the transmitter and the local pipe currents adjacent to the respective receiver. There is some interaction of the receivers that produces a slight difference between $P_1$ and $P_2$. However, as appreciated by those of skill in the art, the difference may generally be ignored, and it may be assumed that the two pipe signals $P_1$ and $P_2$ are equal:

$$P_1(t)=P_2(t)=P(t) \quad \text{Eq. (1)}$$

Assuming M is a transmitter-receiver moment product, it is defined that a first voltage $V_1$ at the first receiver and a second voltage $V_2$ at the second receiver is:

$$V_1=M[\delta(t)+P(t)]*F_1(t) \quad \text{Eq. (2)}$$

$$V_2=M[\delta(t)+P(t)]*F_2(t) \quad \text{Eq. (3)}$$

As used above, $\delta(t)$ is the impulse and is the receiver response to a unit step in magnetic field. Further, P(t) is a voltage response of the receiver due to pipe currents as defined above (i.e., Eq. (1) defines this term as equal or the same for both receivers). The responses ($M[\delta(t)+P(t)]$) are convolved (indicated as "*") with a receiver voltage response to the formation, $F_1(t)$ and $F_2(t)$, respectively.

Moreover, a bucking coefficient k can be defined as the cube of the ratio of the receiver to transmitter distances:

$$k = \left(\frac{d_2}{d_1}\right)^3 \quad \text{Eq. (4)}$$

Those of skill in the art will appreciate that other methods can be used to determine a bucking coefficient. For example, in some embodiments, the bucking coefficient can be measured experimentally or generated and obtained through simulation. Accordingly, the present disclosure is not limited to only Eq. (4) for obtaining and calculating the bucking coefficient. Having the voltage for each receiver and knowing the bucking coefficient k a bucking calculation may be performed using the measured voltages, e.g., perform a bucking calculation using Eq. (2) and Eq. (3):

$$V_1-kV_2=M[F_1(t)-kF_2(t)]+MP*[F_1(t)-kF_2(t)] \quad \text{Eq. (5)}$$

As noted, the symbol denotes convolution. Equation (5) defines the measurement of the transient electromagnetic tool. The first term on the right side of Eq. (5) (e.g., $M[F_1(t)-kF_2(t)]$) is a bucked formation dipole response, while the second term (e.g., $MP*[F_1(t)-kF_2(t)]$) is a bucked formation pipe response. While the bucked formation pipe response is small compared to the dipole formation response, this response must be accounted for when performing inversion, particularly at late times in high resistivity formations.

It can be shown that the bucked formation pipe response is approximately zero. For example, assuming that $F_1$ and $F_2$ are short compared to the pipe response P. In this case we can express the formation responses as:

$$F_1(t) = \frac{\mu_0}{2\pi d_1^3}\delta(t) \quad \text{Eq. (6)}$$

-continued $$F_2(t) = \frac{\mu_0}{2\pi d_2^3}\delta(t) = \frac{1}{k}\frac{\mu_0}{2\pi d_1^3}\delta(t) = \frac{1}{k}F_1(t) \qquad \text{Eq. (7)}$$

Substitution of Eq. (6) and Eq. (7) into Eq. (5) yields:

$$MP*[F_1(t) - kF_2(t)] \approx MP*\left[F_1(t) - k\cdot\frac{1}{k}F_1(t)\right] \approx 0 \qquad \text{Eq. (8)}$$

Accordingly, in view of the above, a basic measurement of a pipe signal can be achieved by bucking out a formation response. To compute the pipe signal P, a bucking calculation should be performed:

$$V_2 - V_1 = M[F_2(t) - F_1(t)] + MP*[F_2(t) - F_1(t)] \qquad \text{Eq. (9)}$$

Figure 6:
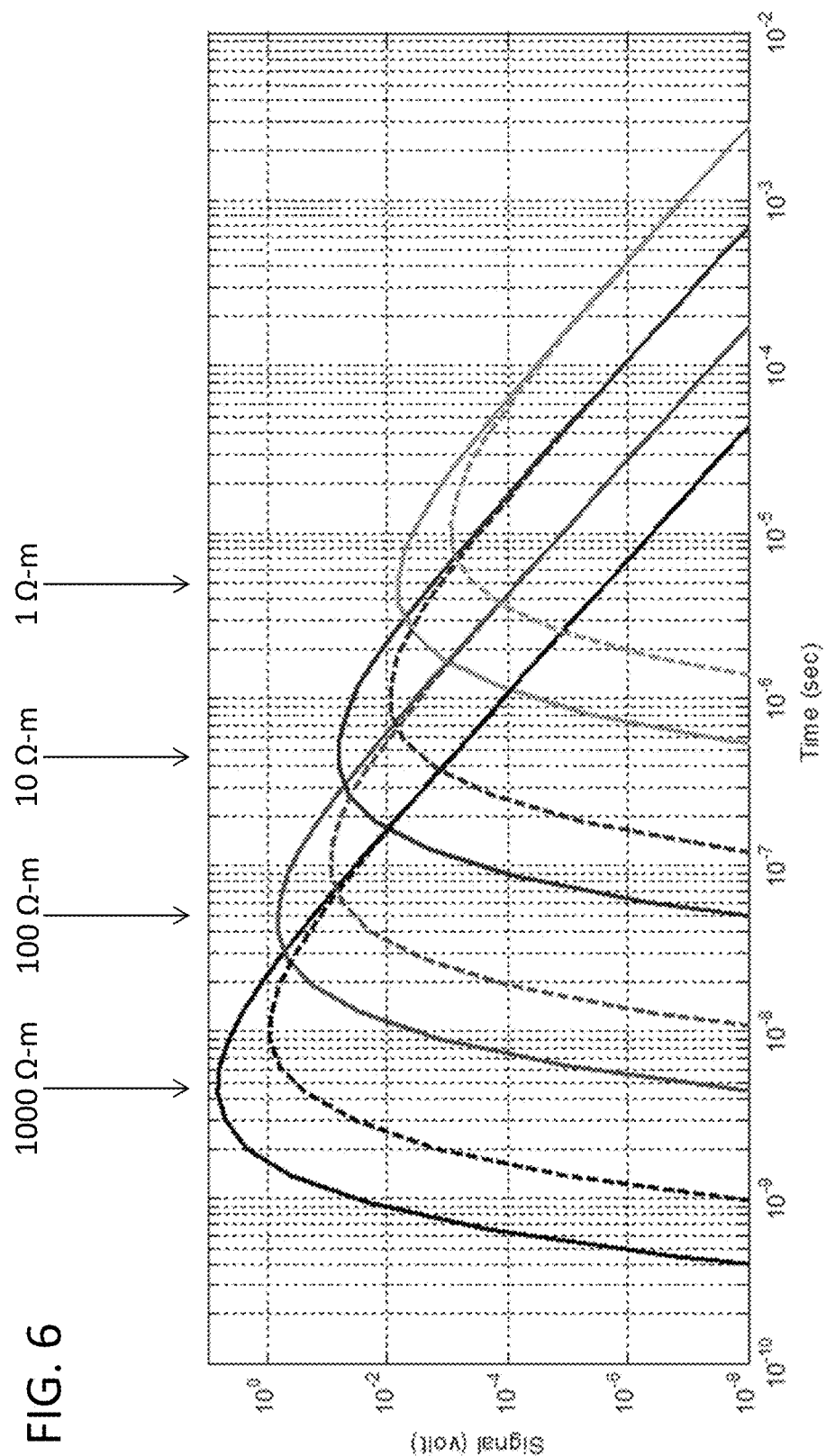
FIG. 6 is a schematic plot of response of two receivers for various homogeneous formations of various resistivities.

Turning now to FIG. 6, various responses of both receiver coils for various homogeneous formations of various resistivities are shown (e.g., 1000 Ω-m; 100 Ω-m; 10 Ω-m; 1 Ω-m). In FIG. 6, the solid curves represent a first response ($F_1$) of a first coil having a distance from an associated transmitter equal to 30 feet (i.e., $d_1$=30 feet). The dashed curved represent a second response ($F_2$) of a second coil having a distance from an associated transmitter equal to 20 feet (i.e., $d_1$=20 feet). The signals shown in FIG. 6 are signal (in volts) as a measure of time, with homogenous formations and ideal receiver responses. As shown, the voltages of the two receivers converge in late time.

That is, FIG. 6 shows ideal receiver responses $F_2$ (lower curves) and $F_1$ (upper curves) for homogeneous formations at various formation resistivities (1000 Ω-m; 100 Ω-m; 10 Ω-m; 1 Ω-m), for receiver spacing of 20 feet and 30 feet respectively. As noted, for each formation resistivity, the responses in the receivers converge and are equal soon after a peak of the respective responses. For example, for the two 1000 ohm-meter receiver curves (far left in FIG. 6), the two signals become equal and overlay after approximately 100 nanoseconds ($10^{-7}$ sec). After the point of convergence for each formation resistivity, the first term in Eq. (9) goes to zero, and the ($F_2-F_1$) difference in the second term goes to zero and stops contributing to the convolution in that term. At this point the approximations of Eq. (5) and Eq. (6) apply. Zeroing out the ($F_2-F_1$) difference in Eq. (9) and applying Eq. (5) and Eq. (6) yields:

$$V_2 - V_1 = MP\frac{\mu_0}{2\pi d_1^3}\left[\frac{1}{k} - 1\right] \qquad \text{Eq. (10)}$$

The calculation from Eq. (10) is the measured version of the pipe signal, which can be scaled appropriately to yield P.

Figure 7:
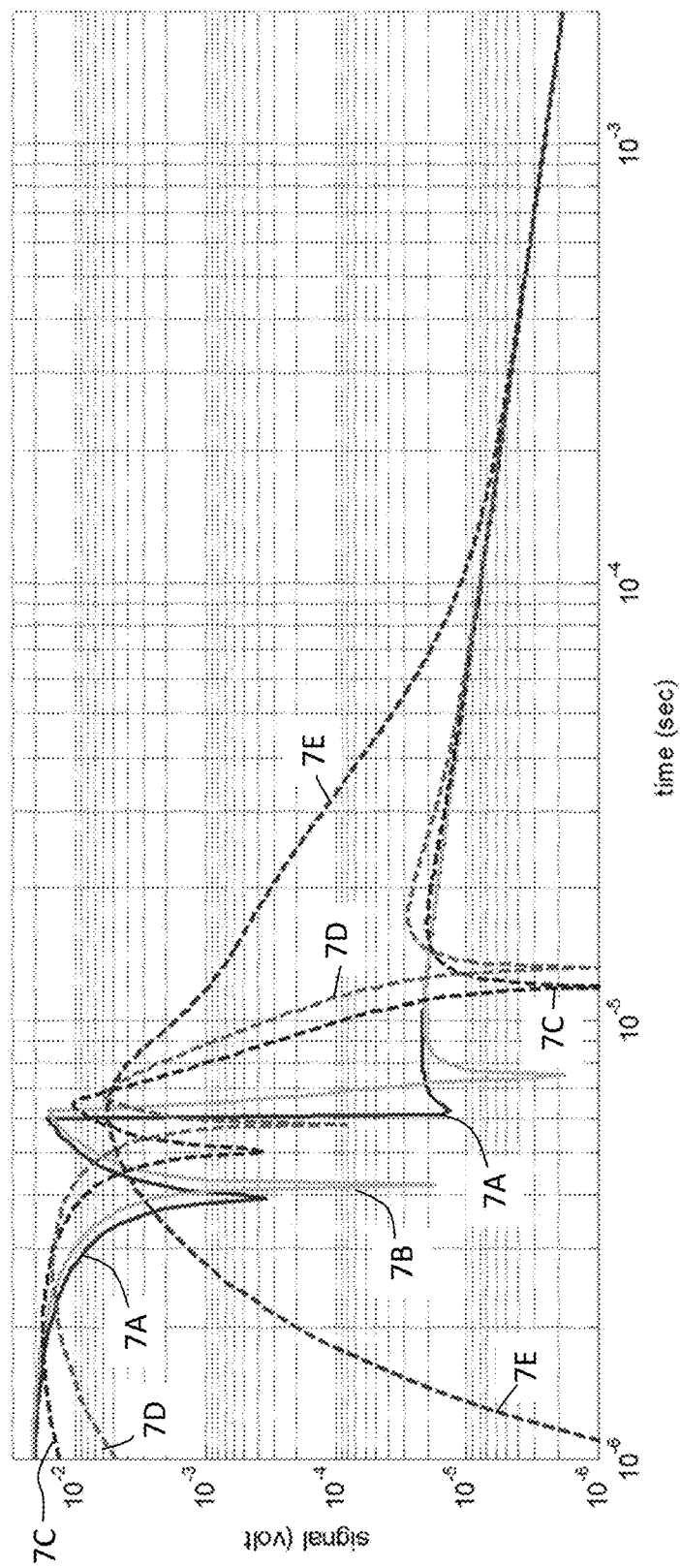
FIG. 7 is a schematic plot of pipe responses shown against various homogeneous formation resistivities.

For example, turning to FIG. 7, a simulation of the pipe measurement method for a tool with a receiver-to-transmitter spacing of 20 feet (bucking coil) and 30 feet (main coil) is shown. An ideal pipe response (curve 7A) is shown against measured responses for various homogeneous formation resistivities. In FIG. 7, curve 7B is a measured response for a homogeneous formation having a resistivity of 100 Ω-m; curve 7C is a measured response for a homogeneous formation having a resistivity of 10 Ω-m; curve 7D is a measured response for a homogeneous formation having a resistivity of 5 Ω-m; and curve 7E is a measured response for a homogeneous formation having a resistivity of 1 Ω-m.

The simulation incorporates a deviation of the transmitted pulse shape from an ideal step in magnetic field. Curve 7A (the ideal response) corresponds to a pipe response when the tool is in free space. Thus, curve 7A is the standard for comparison of the pipe signal measurement method. The remaining curves 7B, 7C, 7D, 7E are produced by a pipe measurement method of Eq. (10), described above, for operation of the tool in homogeneous formations of various resistivities, as noted. A dead time of the tool is about 15 to 20 microseconds, and, as such, any pipe signal measurement that faithfully produces the pipe signal beginning at about 20 microseconds (2*10–5 sec) can be considered a successful pipe signal measurement.

As is apparent in FIG. 7, the pipe signal is faithfully measured after 20 microseconds for formation resistivities of 100 Ω-m and 10 Ω-m. At 5 Ω-m however, the assumption that the receiver signals are equal over the measurement interval is not realized. In this case the measured pipe curve deviates from the standard curve over the range of 10 to 50 microseconds (10-6-5*10-5 sec). For the same reason in the case of formation resistivity of 1 Ω-m the measurement method is not accurate until about 200 microseconds (2*10–4 sec).

In practice, the uncertainty of the measurement at very low formation resistivities (e.g., about 1 Ω-m) is not a severe problem. The deleterious effects of the pipe signal on the formation response measurement at low resistivities are minor and can likely be ignored. As such, the pipe signal measurement is not needed at low formation resistivity. Alternately, the pipe signal measurement from a formation of high resistivity can be measured and stored and used for processing signals at low formation resistivities. The method introduced here is useful for making practical air-hang measurements because the process will cancel effects of formation signals from the Earth or from other objects. In some configurations, it may be practical to conduct an air-hang test on the ground, if the resistivity of the ground beneath the tool is 10 Ω-m or more.

Turning now to FIGS. 8A-8B, an example employing the above described process is shown. FIG. 8A shows a plot of curves of simulated transient measurements in a 10 Ω-m homogeneous formation. FIG. 8B shows a plot of curves of the simulated transient curves of FIG. 8A after using a measured pipe response to compensate and reduce or remove the pipe signal from the measurements.

As noted, FIG. 8A shows an example simulation of a transient electromagnetic measurement made in a homogeneous formation of 10 Ω-m. The receiver-transmitter spacing is 20 feet and 30 feet, for the bucking coil and the main coil, respectively. The received signals are shown as curve 8A (main coil signal) and curve 8B (bucking coil signal). Note that the slow moving pipe signal dominates the received signals. The measured bucked signal of Eq. (5) is shown as curve 8C, while an ideal bucked formation response is shown as curve 8D. As shown, there is a deviation of the measured signal (curve 8C) from the ideal response (curve 8D). To perform an accurate inversion process (e.g., to extract accurate formation property estimates), the deviation between the measured and ideal curves must be corrected for. In FIG. 8A, the bucked pipe signal measurement of Eq. (9) is shown as curve 8E. The measurement (e.g., curve 8E) is scaled to extract the pipe signal P and used for convolution correction of the forward model curve (equivalent to curve 8D) to the measured curve (curve 8C) during inversion.

In accordance with another embodiment, by using auxiliary coils at the transmitter, controlled by a feedback control system, it is possible to measure the pipe signal using the method introduced here and drive the auxiliary coils to produce a field that suppresses the pipe signal. FIG. 8B shows a simulation of such a system applied to the measurement of FIG. 8A. In this case, the pipe signal has been suppressed significantly. For example, comparing curve 8E in FIG. 8A to the corresponding curve 8E on FIG. 8B, the pipe signal has been reduced by a factor of ten. Because of this the pipe has little effect on the measured signal, the measured curve 8C and the ideal curve 8D in FIG. 8B are essentially equal and overlay or overlap.

Figure 9:
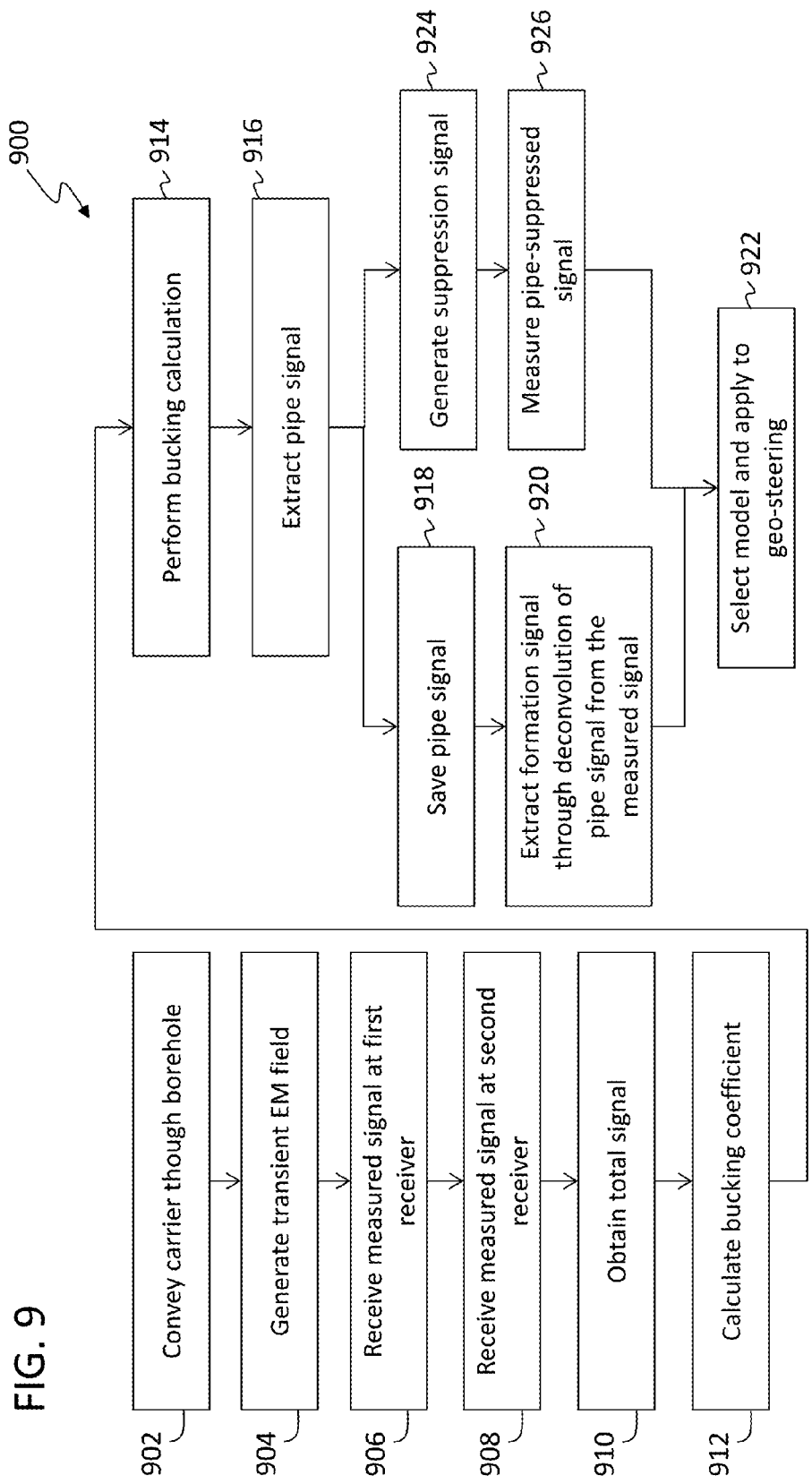
FIG. 9 is a flow process for estimating a property of an earth formation penetrated by a borehole in accordance with an embodiment of the present disclosure.

Turning now to FIG. 9, a flow process in accordance with an embodiment of the present disclosure is shown. The flow process 900 can be used to determine a pipe signal (e.g., extract a pipe signal) which can be measured downhole with a transmitter and two associated receivers located at first and second distances from the transmitter. The flow process 900 is used to extract a real-time or in situ pipe signal which can be used to extract the formation signal and thus an accurate representation or estimate of formation properties can be obtained. Further, because the process 900 is performed in situ any changes in a pipe signal due to bending, temperature, and/or other variables that can affect pipe resistivity and/or conductivity downhole.

At block 902, a carrier having a tool is conveyed downhole. Conveying the carrier and tool can be performed in any of known processes. Further, the carrier can be part of a wireline tool or part of a drill string, or other downhole conveyance structure, without departing from the scope of the present disclosure. In one embodiment, the tool is configured on a drill string and the process 900 is used to adjust and/or modify a drilling operation such as to apply geo-steering to the drilling operation in response to detected and/or estimated formation properties.

At block 904, the transmitter is used to generate a transient electromagnetic field downhole. The generated transient electromagnetic field will induce a response in the formation that is around the transmitter and also in the carrier that the transmitter is configured on.

At block 906, a measured signal will be detected at a first receiver. The first receiver may be a main receiver. Similarly, at block 908, a measured signal will be detected at a second receiver. The second receiver may be a bucking receiver. As will be appreciated by those of skill in the art, the two signals of block 906, 908 will be slightly different, and thus the two signals can be used to extract out certain features of the signals.

At block 910, between the two signals received at blocks 906, 908, a total signal is obtained. The total signal is the signal received by the receivers, with the signal including both responses from the formation and the pipe. Because the pipe can impact formation estimates and approximations adversely, it is advantageous to remove the pipe signal from the total signal.

Accordingly, at block 912 a bucking coefficient is calculated. The bucking coefficient can be calculated as a cube of the ratio of the receiver-to-transmitter distances. For example, Eq. (4) described above can be used to calculate the bucking coefficient k. Those of skill in the art will appreciate that other methods and processes for determining and/or calculating the bucking coefficient k are possible without departing from the scope of the present disclosure. For example, in some embodiments, the bucking coefficient may be can be calculated directly from ratios of pipe signals at the two receivers of the system.

Knowing the signals at the first and second receivers and the bucking coefficient k, a bucking calculation can be performed at block 914. The bucking calculation of block 914 employs Eqs. (5)-(7), as described above.

From the bucking calculation of block 914, a pipe signal can be extracted from the downhole measurements, the bucking coefficient k, and the bucking calculation at block 916. Thus, an in situ calculation of the pipe signal can be extracted. At block 918, the extracted pipe signal is operationally saved and/or transmitted to the surface (and then saved). The extracted pipe signal can be saved or stored on memory that is part of a geo-steering system that controls operation of a drill to which the tool is connected.

Having the pipe signal from block 916, the extracted pipe signal can be deconvolved from the total signal, as shown at block 920. With the in situ pipe signal extracted from the total signal, an accurate representation of the formation signal may be obtained. Accordingly, at block 922, using the measured pipe suppressed formation signal, a model is selected that is representative of the current formation properties downhole and the model can be applied to geo-steering of the drill.

In an alternative embodiment, or in combination with the above described embodiment, once the pipe signal is extracted at block 916, the downhole tool can be configured to generate a suppression signal based on the extracted pipe signal, as shown at block 924. That is, in some embodiments, the downhole tool can be configured with two transmitters, a first transmitter configured as a main or primary transmitter, and a second transmitter configured as an auxiliary or suppression transmitter. The first transmitter is used to generate the total signal, from which the pipe signal is extracted, and then the second transmitter is configured to transmit a suppression signal that is configured to cancel, suppress, or otherwise minimize or eliminate the pipe signal from the total signal.

Thus, as shown at block 926, a pipe-suppressed signal can be detected or measured by the receivers wherein the pipe signal is suppressed. The pipe-suppressed signal can then be used to select a model and geo-steering can be appropriately adjusted (e.g., the pipe-suppressed signal can be saved, stored, processed, etc. to enable improved formation estimation and geo-steering) as shown at block 922.

An example of a dual-transmitter configuration is schematically illustrated in FIG. 10. As shown, a carrier 1000 is configured with a first transmitter 1002 thereon. Further, located at the same location, and wrapped around the first transmitter 1002, is a second transmitter 1004. The first transmitter 1002 and the second transmitter 1004 are configured to be separately controlled such that two different signals or transmissions can be generated therefrom. For example, as described above, the first transmitter 1002 can be driven to generate a first or main signal within a formation and/or along the carrier. Further, upon extracting a pipe signal (e.g., from the first signal) the second transmitter 1004 can be driven to generate a suppression signal that is configured to minimize, suppress, and/or cancel the pipe signal.

The receivers of the system (as described above) will then measure a pipe-suppressed signal that is a combination of the main signal and the suppression signal. The pipe-suppressed signal will be a signal that is only a signal or response generated by a formation, and thus an accurate estimation and/or approximation of formation properties can be determined. That is, from the pipe-suppressed signal a best-fit model may be selected to match the formation signal. From this, an operator may make informed decisions based on in situ measurements and estimations of formation properties that are made without a pipe signal affecting the measurements and/or estimations.

In one non-limiting alternative configuration, the above described process can be modified such that an extracted pipe signal is used for matching a simulated formation signal to a measured formation signal. For example, an operator can use an iterative search process to find structural parameters that generate a simulated formation signal, that when convolved with the extracted pipe signal, best matches the measured total signal downhole. That is, by convolving the simulated signal with the pipe signal, one can determine a best fit model, and thus find best fit parameters and estimates for a formation signal and thus drilling decisions may be based on this process.

In accordance with some embodiments, the formation property obtained through the above described processes is a resistivity of an earth formation such that an operator may make informed decisions regarding geo-steering. Accordingly, embodiments provided herein may improve downhole operations, including but not limited to, improving efficiencies in measurement-while-drilling operations.

In sum, in accordance with embodiments provided herein, a method and/or process for determining a resistivity property of an earth formation (or other properties) is provided. The process includes producing a transient electromagnetic signal using a transmitter on a carrier downhole (or in situ). Using two receivers on the carrier, downhole, a detected signal is affected by a finite, non-zero conductivity of the carrier. a bucking coefficient k can be calculated using a processor, with the bucking coefficient based on a ratio of distances between the receivers and the transmitter or measured experimentally. Knowing a current total signal and the bucking coefficient, a bucking calculation can be performed to extract a pipe signal from the total signal. The pipe signal can then be convolved from the total signal to obtain an accurate representation of the downhole formation.

Set forth below are some embodiments of the foregoing disclosure:

Embodiment 1

A method for estimating a property of an earth formation penetrated by a borehole, the method comprising: conveying a carrier through a borehole, the carrier having a transmitter, a first receiver, and a second receiver disposed thereon, the first receiver being positioned at a first distance from the transmitter and the second receiver being positioned at a second distance from the transmitter; generating, while downhole, using the transmitter, a transient electromagnetic field; receiving a first measured signal at the first receiver; receiving a second measured signal at the second receiver; obtaining a total signal from the first measured signal and the second measured signal; determining a bucking coefficient k; performing a bucking calculation employing the bucking coefficient k, the first measured signal, and the second measured signal to extract a pipe signal; suppressing the pipe signal from the total signal to obtain a formation signal; estimating a formation property from the formation signal to select a model of the formation; and adjusting a drilling operation based on the estimated property of the formation.

Embodiment 2

The method of embodiment 1, further comprising storing the extracted pipe signal either downhole or at a surface system.

Embodiment 3

The method of embodiment 1, wherein the bucking coefficient is calculated using a ratio of the first distance and the second distance:

$$k = \left(\frac{d_2}{d_1}\right)^3.$$

Embodiment 4

The method of embodiment 1, wherein the bucking calculation comprises $V_1 - kV_2 = M[F_1(t) - kF_2(t)] + MP^*[F_1(t) - kF_2(t)]$, wherein V1 is a voltage at the first receiver, V2 is a voltage at the second receiver, M is a transmitter-receiver moment product, P is the pipe signal, and F1 and F2 are the responses to the formation at the first receiver and the second receiver, respectively.

Embodiment 5

The method of embodiment 4, wherein the pipe signal is extracted using $V_2 - V_1 = M[F_2(t) - F_1(t)] + MP^*[F_2(t) - F_1(t)]$.

Embodiment 6

The method of embodiment 1, further comprising scaling the extracted pipe signal to solve for the pipe signal.

Embodiment 7

The method of embodiment 1, wherein the property of the formation is a resistivity of the formation.

Embodiment 8

The method of embodiment 1, wherein the transmitter is a first transmitter, the method further comprising generating a suppression signal with a second transmitter located at the position of the first transmitter, wherein the suppression signal is based on the extracted pipe signal.

Embodiment 9

The method of embodiment 8, further comprising detecting a pipe-suppressed signal wherein the pipe-suppressed signal is combination of the transient electromagnetic field and the suppression signal.

Embodiment 10

The method of embodiment 9, further comprising estimating a formation property based on the pipe-suppressed signal.

Embodiment 11

The method of embodiment 1, wherein the bucking coefficient is measured experimentally.

Embodiment 12

A system for estimating a property of an earth formation penetrated by a borehole, the system comprising: a carrier configured to be conveyed through a borehole; a transmitter disposed on the carrier and configured to transmit transient electromagnetic fields; a first receiver disposed on the carrier a first distance from the transmitter and configured to receive signals from the transmitter; a second receiver disposed on the carrier a second distance from the transmitter and configured to receive signals from the transmitter; and a processor configured to estimate a property of the formation, the system configured to: generate, while downhole, a transient electromagnetic field at the transmitter; receive a first measured signal at the first receiver; receive a second measured signal at the second receiver; obtain a total signal from the first measured signal and the second measured signal; determine a bucking coefficient k; perform a bucking calculation employing the bucking coefficient k, the first measured signal, and the second measured signal to extract a pipe signal; suppress the pipe signal from the total signal to obtain a formation signal; and estimate a formation property from the modified total signal to select a model of the formation.

Embodiment 13

The system of embodiment 12, further comprising a memory configured to store the extracted pipe signal either downhole or at a surface system.

Embodiment 14

The system of embodiment 12, the processor further configured to adjust a drilling operation based on the estimated property of the formation.

Embodiment 15

The system of embodiment 12, wherein the bucking coefficient is calculated using a ratio of the first distance and the second distance:

$$k = \left(\frac{d_2}{d_1}\right)^3.$$

Embodiment 16

The system of embodiment 12, wherein the bucking calculation comprises $V_1-kV_2=M[F_1(t)-kF_2(t)]+MP*[F_1(t)-kF_2(t)]$, wherein V1 is a voltage at the first receiver, V2 is a voltage at the second receiver, M is a transmitter-receiver moment product, P is the pipe signal, and F1 and F2 are the responses to the formation at the first receiver and the second receiver, respectively.

Embodiment 17

The system of embodiment 16, wherein the pipe signal is extracted using $V_2-V_1=M[F_2(t)-F_1(t)]+MP*[F_2(t)-F_1(t)]$.

Embodiment 18

The system of embodiment 12, the processor further configured to scale the extracted pipe signal to solve for the pipe signal.

Embodiment 19

The system of embodiment 12, wherein the property of the formation is a resistivity of the formation.

Embodiment 20

The system of embodiment 12, wherein the transmitter is a first transmitter, the system further comprising a second transmitter located at the position of the first transmitter and configured to generate a suppression signal, wherein the suppression signal is based on the extracted pipe signal.

Embodiment 21

The system of embodiment 20, wherein the first and second receivers are configured to detect a pipe-suppressed signal wherein the pipe-suppressed signal is combination of the transient electromagnetic field and the suppression signal.

Embodiment 22

The system of embodiment 21, the processor further configured to estimate a formation property based on the pipe-suppressed signal.

Embodiment 23

The system of embodiment 12, wherein the bucking coefficient is measured experimentally.

The systems and methods described herein provide various advantages. For example, various embodiments provided herein may provide improved and/or efficient processes for estimating a formation property. Such efficient and improved estimation may be made in improved timeframes (and in situ), thus enabling an operator to make informed decisions regarding drilling and/or other downhole operations, and make adjustments thereto, as needed. Further advantages of various embodiments may include providing a very fast and accurate estimation of formation properties as compared to prior processes for making similar estimations.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A method for estimating a property of an earth formation penetrated by a borehole, the method comprising:
    conveying a carrier through a borehole, the carrier having a transmitter, a first receiver, and a second receiver disposed thereon, the first receiver being positioned at a first distance from the transmitter and the second receiver being positioned at a second distance from the transmitter;
    generating, while downhole, using the transmitter, a transient electromagnetic field;
    receiving a first measured signal at the first receiver;
    receiving a second measured signal at the second receiver;
    obtaining a total signal from the first measured signal and the second measured signal;
    determining a bucking coefficient k, wherein $$k \cong \frac{\int_0^\infty F_2 dt}{\int_0^\infty F_1 dt};$$

performing a bucking calculation employing the bucking coefficient k, the first measured signal, and the second measured signal to extract a pipe signal, using the relation, $$V_2 - V_1 = MP \frac{\mu_0}{2\pi d_1^2} \left[ \frac{1}{k} - 1 \right],$$

wherein a first voltage $V_1$ is received at the first receiver, a second voltage $V_2$ is received at the second receiver, M is a transmitter-receiver moment product, and P is the pipe signal;
    suppressing the pipe signal from the total signal to obtain a formation signal;
    estimating a formation property from the formation signal to select a model of the formation; and
    adjusting a drilling operation based on the estimated property of the formation.

2. The method of claim 1, further comprising storing the extracted pipe signal either downhole or at a surface system.

3. The method of claim 1, wherein the bucking coefficient is calculated using a ratio of the first distance and the second distance:

$$k = \left( \frac{d_2}{d_1} \right)^3.$$

4. The method of claim 1, wherein the bucking calculation comprises $V_1 - kV_2 = M[F_1(t) - kF_2(t)] + MP*[F_1(t) - kF_2(t)]$, wherein $V_1$ is a voltage at the first receiver, $V_2$ is a voltage at the second receiver, M is a transmitter-receiver moment product, P is the pipe signal, and $F_1$ and $F_2$ are the responses to the formation at the first receiver and the second receiver, respectively.

5. The method of claim 4, wherein the pipe signal is extracted using $V_2 - V_1 = M[F_2(t) - F_1(t)] + MP*[F_2(t) - F_1(t)]$.

6. The method of claim 1, further comprising scaling the extracted pipe signal to solve for the pipe signal.

7. The method of claim 1, further comprising at least one of:
    (i) using the measured pipe signal P to deconvolve the measured buck signal response to extract a measured pipe-free bucked signal response that is used for formation structure inversion by finding a formation model with a synthetic pipe-free bucked signal response that matches the measured pipe-free bucked signal response; and
    (ii) using the measured pipe signal P during inversion to convert pipe-free synthetic response to pip-convolved synthetic responses for formation structure inversion by finding a formation model with a synthetic pipe-convolved bucked signal response that matches the measured pipe-convolved bucked signal response.

8. The method of claim 1, wherein the transmitter is a first transmitter, the method further comprising generating a suppression signal with a second transmitter located at the position of the first transmitter, wherein the suppression signal is based on the extracted pipe signal.

9. The method of claim 8, further comprising detecting a pipe-suppressed signal wherein the pipe-suppressed signal is combination of the transient electromagnetic field and the suppression signal.

10. The method of claim 9, further comprising estimating a formation property based on the pipe-suppressed signal.

11. The method of claim 1, wherein the bucking coefficient is measured experimentally.

12. A system for estimating a property of an earth formation penetrated by a borehole, the system comprising:
a carrier configured to be conveyed through a borehole;
a transmitter disposed on the carrier and configured to transmit transient electromagnetic fields;
a first receiver disposed on the carrier a first distance from the transmitter and configured to receive signals from the transmitter;
a second receiver disposed on the carrier a second distance from the transmitter and configured to receive signals from the transmitter; and
a processor configured to estimate a property of the formation, the system configured to:
generate, while downhole, a transient electromagnetic field at the transmitter;
receive a first measured signal at the first receiver;
receive a second measured signal at the second receiver;
obtain a total signal from the first measured signal and the second measured signal;
determine a bucking coefficient k, wherein $$k \cong \frac{\int_0^\infty F_2 dt}{\int_0^\infty F_1 dt};$$

perform a bucking calculation employing the bucking coefficient k, the first measured signal, and the second measured signal to extract a pipe signal, using the relation, $$V_2 - V_1 = MP \frac{\mu_0}{2\pi d_1^2}\left[\frac{1}{k} - 1\right],$$

wherein a first voltage $V_1$ is received at the first receiver, a second voltage $V_2$ is received at the second receiver, M is transmitter-receiver moment product, and P is the pipe signal;
suppress the pipe signal from the total signal to obtain a formation signal; and
estimate a formation property from the modified total signal to select a model of the formation.

13. The system of claim 12, further comprising a memory configured to store the extracted pipe signal either downhole or at a surface system.

14. The system of claim 12, the processor further configured to adjust a drilling operation based on the estimated property of the formation.

15. The system of claim 12, wherein the bucking coefficient is calculated using a ratio of the first distance and the second distance:

$$k = \left(\frac{d_2}{d_1}\right)^3.$$

16. The system of claim 12, wherein the bucking calculation comprises $V_1 - kV_2 = M[F_1(t) - kF_2(t)] + MP^*[F_1(t) - kF_2(t)]$, wherein $V_1$ is a voltage at the first receiver, $V_2$ is a voltage at the second receiver, M is a transmitter-receiver moment product, P is the pipe signal, and $F_1$ and $F_2$ are the responses to the formation at the first receiver and the second receiver, respectively.

17. The system of claim 16, wherein the pipe signal is extracted using $V_2 - V_1 = M[F_2(t) - F_1(t)] + MP^*[F_2(t) - F_1(t)]$.

18. The system of claim 12, the processor further configured to scale the extracted pipe signal to solve for the pipe signal.

19. The system of claim 12, the processor further comprising to at least one of:
(i) use the measured pipe signal P to deconvolve the measured buck signal response to extract a measured pipe-free bucked signal response that is used for formation structure inversion by finding a formation model with a synthetic pipe-free bucked signal response that matches the measured pipe-free bucked signal response; and
(ii) use the measured pipe signal P during inversion to convert pipe-free synthetic response to pip-convolved synthetic responses for formation structure inversion by finding a formation model with a synthetic pipe-convolved bucked signal response that matches the measured pipe-convolved bucked signal response.

20. The system of claim 12, wherein the transmitter is a first transmitter, the system further comprising a second transmitter located at the position of the first transmitter and configured to generate a suppression signal, wherein the suppression signal is based on the extracted pipe signal.

21. The system of claim 20, wherein the first and second receivers are configured to detect a pipe-suppressed signal wherein the pipe-suppressed signal is combination of the transient electromagnetic field and the suppression signal.

22. The system of claim 21, the processor further configured to estimate a formation property based on the pipe-suppressed signal.

23. The system of claim 12, wherein the bucking coefficient is measured experimentally.

* * * * *